June 19, 1951      P. R. NOLAN      2,557,887
STARTER BUTTON FOR MOTOR VEHICLES
Filed March 7, 1949
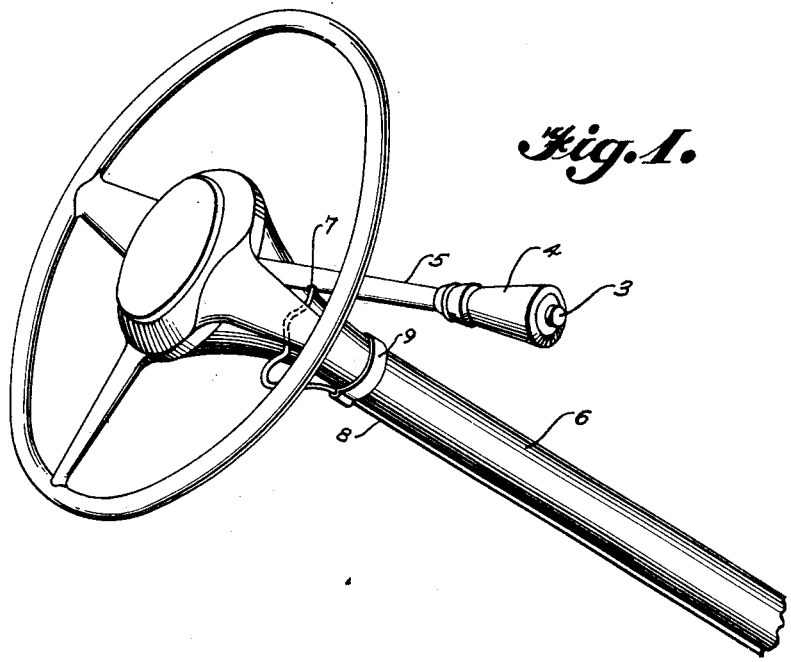
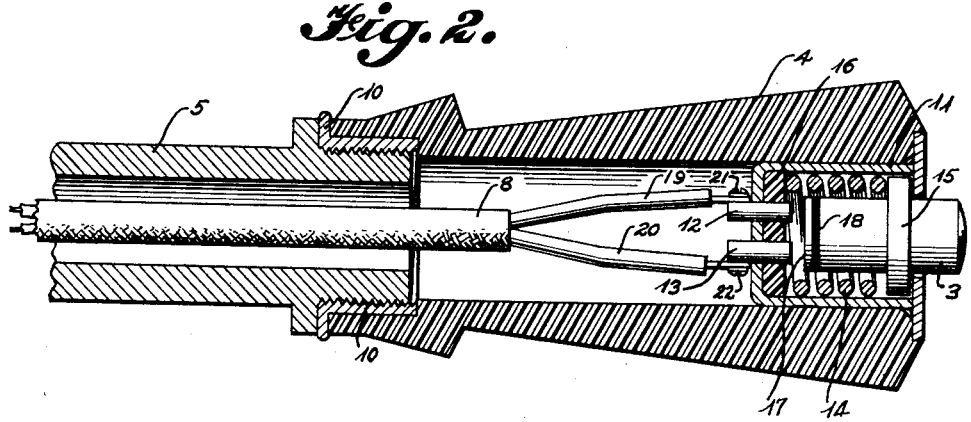
INVENTOR.
Patrick Robert Nolan
BY Stevens, Davis, Miller & Mosher
ATTORNEYS.

Patented June 19, 1951

2,557,887

UNITED STATES PATENT OFFICE 2,557,887

STARTER BUTTON FOR MOTOR VEHICLES

Patrick Robert Nolan, Oklahoma City, Okla.

Application March 7, 1949, Serial No. 80,008

1 Claim. (Cl. 200—59)

This invention relates to an improvement in the electrical starting system for automobiles and more particularly to a novel positioning of the starting button for such systems.

The positioning of the starter button in automobiles has received considerable attention in recent years. The industry, through competitive impetus, has concentrated its efforts toward providing means for simplifying the operation of a motor vehicle. As a product of this impetus, the necessary devices for starting, operating and stopping automobiles have been through a series of changes, not only in their structure but in their location as well.

The later models of cars have, to a large measure, confined the location of the starter button to the dashboard. Usually it is positioned on the dashboard accessible to the operator's left hand. To start a car with the button so located, it is necessary to place the left hand on the button and the right hand on the wheel. When the motor turns over, the left hand is shifted to the wheel and the right hand to the gear lever. This operating technique is still further complicated when it becomes necessary for the operator to use his hand for signaling. It is obvious, then, that such an arrangement does not offer a convenient and easy method of accomplishing all the necessary steps that are required in the ordinary process of starting and operating an automobile. The continual shifting of hands and resulting loss of time, and in some cases the probability of neglecting proper operating safety techniques, are disadvantages inherent in such a system.

The location of the button on the dashboard of the car places it in confusing relation to other buttons and devices that may also be located there. The operator is forced to take his eyes from the road and search the panel for the button. This disadvantage leads to unsafe operation when the car has stalled while in motion.

The object of this invention is to provide a starter button which is so located in relation to the driving wheel and gear shift as to greatly facilitate the technique of driving a car. By locating the button at the end of the gear shift lever, it is then easily accessible to the operator. It is particularly so in those models which have mounted the gear shift lever on the steering wheel column. In these models, one hand can control the wheel, gear shaft and starter. The other hand can be used for operating signals. The button so located is out of alignment with other devices in the car and the operator need not take his eyes from the road when its use is demanded while the car is in motion.

Many other and further objects, advantages and features of the present invention will become more clearly apparent from the following specifications, the drawings related thereto, and from the claim hereinafter set forth.

In the drawings:

Figure 1 illustrates in perspective the starter button mounted in the gear shift knob.

Figure 2 is a fragmentary longitudinal section of the gear shift knob and lever arm shown in Figure 1.

Referring to the drawings, in Figure 1, the starter button 3 is centrally mounted in the gear shift knob 4. The gear shift knob is detachably mounted to the gear shift lever 5. The lever is connected in the conventional manner to the steering wheel shaft of the usual type 6. At a point on the gear shift lever is an outlet 7 and through this outlet pass the two electrical conductors, preferably contained in one cable 8. This cable extends from the solenoid in the starting system to the starter button. In the drawings as shown the cable is admitted through the outlet 7 and runs along the axis of the lever to the starter button. This is the preferred arrangement. However, the cable may be attached by suitable means to the outside of the lever and admitted to the knob and contact points for the button through an outlet in the knob itself.

The cable 8 is supported to the steering wheel shaft by suitable means as a ring 9. There may be a plurality of such rings mounted at spaced distances along the shaft. The two electrical conductors contained within the cable are connected to the solenoid of the starting system in the conventional manner.

In Figure 2 the gear shift knob 4 is detachably mounted to the lever 5 by means of screw threaded sleeve member 10. This member 10 is rigidly associated with the knob by any suitable means. The housing member 11 is centrally mounted in the knob and rigidly associated therewith by any suitable means. The push button 3 is mounted within the housing and held in a spaced distance from the contact points 12 and 13 by the pressure of spring 14 applied against the circular flange member 15. This flange member is rigidly connected to the push button by any suitable means.

The spring member is mounted within the housing and longitudinally displaced between the flange of the button and annular plate member 16. This plate member is provided with two outlets of sufficient diameter to admit the two contact points.

The push button is normally held by the spring in a position of no-contact between the contact points and the base member of the button 17. This base member is of suitable electrical conducting material and is insulated from the main body of the push button by insulating member 18.

The contact points 12 and 13 are of a suitable electrical conducting material and are connected to electrical conductors 19 and 20 by screw members 21 and 22. They are encased in suitable insulating material and extend into cable 8. Cable 8 extends longitudinally through the gear shift lever and may be supportably mounted therein by any suitable means not shown.

As was shown in Figure 1, the electrical conductors 19 and 20 contained within the cable 8 extend along the axis of the gear shift lever 5 and pass through the outlet 7. The cable 8 extends along the shaft of the steering wheel to the solenoid of the starting system. The electrical conductors contained therein are connected to the solenoid in the conventional manner.

The drawings illustrate the preferred embodiment of this invention. Many modifications in the embodiment herein described may be made without departing from the spirit and scope of the invention as set forth in the following claim.

What I claim is:

In a motor vehicle including a motor, a starter and an electrical circuit therefor, a steering wheel and shaft therefor, a transmission, a shift lever mounted on said steering wheel shaft for adjusting the gear ratio in said transmission, and a lever knob detachably mounted on the end of said lever, the improvement that comprises a switch controlling actuation of said starter, a housing for said switch, said switch and said housing being positioned in a cavity defined within said knob, said switch including a push button and two electrical contact points for said starter circuit all mounted in said housing, said push button having one end extending into said housing with resilient means to normally urge said end away from contact with said contact points and the other end extending out of said housing and said knob, a stop on said push button to prevent said button from escaping from said housing and said knob when urged in an outward direction by said resilient means.

PATRICK ROBERT NOLAN.

REFERENCES CITED

The following references are of record in the file of this patent:

UNITED STATES PATENTS

| Number | Name | Date |
|--------|------|------|
| 1,254,349 | Patch | Jan. 22, 1918 |
| 1,691,417 | Ward | Nov. 13, 1923 |
| 1,895,337 | Nester | Jan. 24, 1933 |
| 1,931,775 | Stafak | Oct. 24, 1933 |
| 1,985,808 | Suiter | Dec. 25, 1934 |